United States Patent [19]
Evans

[11] 4,193,867
[45] Mar. 18, 1980

[54] OPERATION OF A TWO-PHASE REACTOR

[75] Inventor: Sheldon Evans, Overveen, Netherlands

[73] Assignee: Hoogovens IJmuiden, B.V., IJmuiden, Netherlands

[21] Appl. No.: 619,245

[22] Filed: Oct. 3, 1975

[30] Foreign Application Priority Data

Oct. 3, 1974 [GB] United Kingdom ............... 43015/74

[51] Int. Cl.² ............................................. B01D 15/06
[52] U.S. Cl. ..................................... 210/20; 210/30 R
[58] Field of Search ................. 210/20, 35, 37 R, 290, 210/30 R

[56] References Cited

U.S. PATENT DOCUMENTS

| | | |
|---|---|---|
| 3,385,788 | 5/1968 | Hunter .................................. 210/35 |
| 3,458,436 | 7/1969 | Martinola et al. ..................... 210/35 |
| 3,471,025 | 10/1969 | Dobson ................................. 210/290 |
| 3,568,833 | 3/1971 | Ritzen ..................................... 210/35 |
| 3,711,401 | 1/1973 | Hamilton et al. ................... 210/37 R |

*Primary Examiner*—Charles N. Hart
*Assistant Examiner*—Ivars Cintins
*Attorney, Agent, or Firm*—Stevens, Davis, Miller & Mosher

[57] ABSTRACT

A regenerative base ion exchange process involving the step of passing a liquid upwardly through a bed of particulate solid base ion exchange resin in a chamber of a two-phase reactor to regenerate said resin, wherein the rate of liquid flow is such that the solid resin is compacted and held by the liquid as a compact bed against a barrier located above it and is prevented by the liquid from sinking.

11 Claims, 2 Drawing Figures

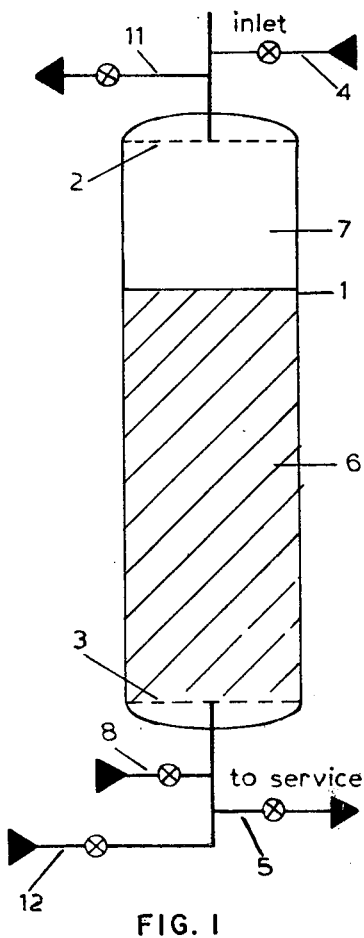
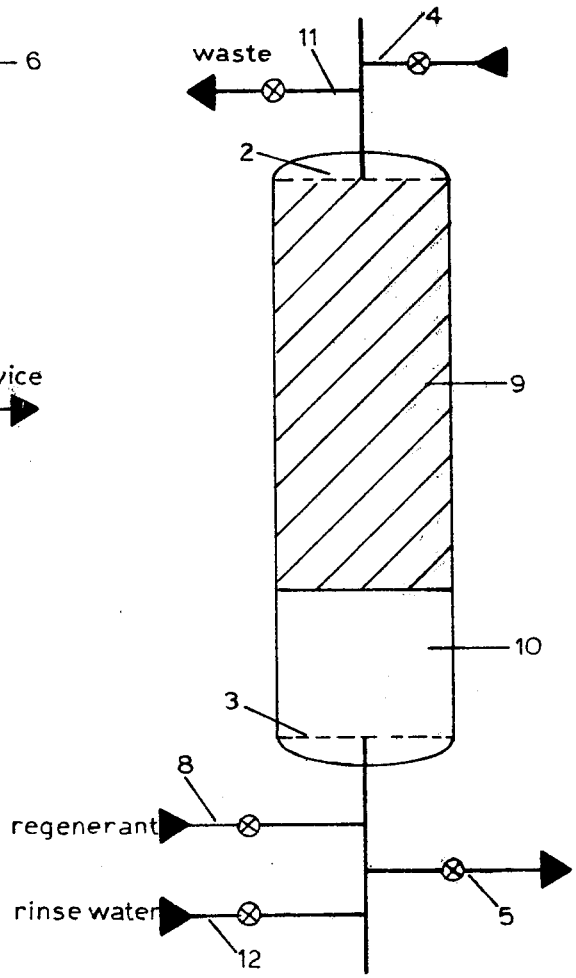
FIG. 1
FIG. 2

OPERATION OF A TWO-PHASE REACTOR

This invention relates to processes performed in two-phase reactors and to methods of operation of such reactors.

In operation of a two-phase reactor, it is well known to pass a liquid upwardly through a bed of solid granular material which is contained in a chamber of the reactor, while a reaction takes place between the two phases. This is known as upflow operation. As an example of such a process there can be mentioned the regeneration of ion exchange resins, though the invention is certainly not restricted to this. It also can be applied for example to demineralization and filtration in technical applications such as seperation processes, to desalination, demineralization, organics removal, nitrate and phosphate removal, and to the regeneration of multi-beds, of which a single bed containing both strong and weak base ion exchange resins is an example.

The advantages of upflow operation are well known. However, it also is known that upflow operation may involve certain drawbacks when it is attempted to optimize processes and installations. One such drawback is that the bed may fluidize during upflow operation. Several techniques have been proposed to ensure a compact bed on the bottom of the vessel during upflow operation. In one, a balloon located in the free space is inflated before upflow operation. In another, there is a nozzle system and a drain located at the top of the bed. While reaction fluid, for example a regenerant, enters upflow and exits via this center drain, air or water is introduced at the nozzle system and exits at the center drain as well. These known processes and apparatus are relatively costly, apart from having other disadvantages described below.

According to the invention there is provided a process involving the step of passing a liquid upwardly through a bed of particulate solid material in a chamber of a two-phase reactor, wherein the rate of liquid flow is such that the solid material is held by the liquid as a compact bed against a barrier located above it and is prevented by the liquid from sinking. In this way, a simple solution to the problems of upflow operation of a two-phase reactor can be obtained, by abandoning the principle that the bed should be kept compact at the bottom of the reaction chamber. The process of the invention opens up entire new perspectives in the design of ion exchangers, filter materials, adsorbants etc., as special lighter weight materials may now be used, which are suitable to be compacted against the top end of the chamber. Means to prevent fluidization of the bed are no longer required.

The rate of upward flow necessary to achieve compaction of the bed against a barrier above it will be easily determined for each case. Desirably the material of the bed is, e.g. in respect of its density and grain size, such that a liquid flow rate can be selected which is optimal for the reaction being performed. There may be a range of optimal flow rates.

We use the term compact bed to distinguish it from a fluidized bed.

Preferably, plug flow of the liquid is approximated through the chamber containing the solid material. In plug flow, the speed of flow is uniform over the whole cross-section of the chamber, i.e. the liquid is moving as a solid plug. Desirably the pressure drop is as low as possible, and the approximation to plug flow should be as close as possible. Suitably, the liquid passes through distributors at upper and lower ends of the chamber, the distributors being adapted to retain the solid material in the chamber and to cause the liquid flow to approximate to said plug flow.

Plug flow is highly desirable because any serious deviation from it will affect the lowest flow rate at which the entire mass compacts against the top end of the chamber, thus restricting the selection of suitable particulate materials.

In comparison with known processes, there may be a reduction in free space in the reactor chamber such that with a given desirable upflow rate the bed, or a portion thereof, compacts against the top of the vessel. Advantageously the free space inside the chamber amounts to less than 50% of the space occupied by the compact bed of granules (including its interstices), and preferably said free space is between 30% to 40% of the space occupied by the bed.

In known processes involving filter beds or ion exchangers, the bed is usually backwashed. In such a case the bed is fluidized by increasing liquid flow, and sometimes by also adding air to the liquid flow. Usually it has been found necessary for effective rinsing and/or backwashing to provide for a free space of approximately 100%. It will be clear that the reduction in space obtainable with the invention results in capital economy, in reduction of the total volume of the unit to be rinsed, and in a more rapid removal of unwanted solid materials. The saving in cost may be achieved by increasing the quantity of product per unit vessel, which may for instance result in approximately 50% increase in bed depth by reducing the free space from 100% to 30%. It will be clear that an increase in bed depth in a vessel directly results in increasing the capacity of the vessel.

Though the process of the invention can be used for performing a single operation of the reactor, most flexibility in operating the reactor is obtained if the process of the invention is alternated with different modes of operation of the reactor. For instance the upflow operation can be a regeneration following a service cycle which may be either upflow or downflow. It will be clear that such a process can be performed with a single bed of uniform granules. However, it has also been found that the process can be advantageously applied to the regeneration of a particulate bed consisting of a layer weak base ion exchange resin on top of a layer strong base resin.

More generally in the process the bed of particulate material may consist of different components which are arranged either admixed or in layers. Good results have been obtained if apart from the upfloating particulate material a quantity of another particulate material is present which remains at the bottom of the chamber. For instance, the chamber may contain two different materials whose densities differ widely, for example, gravel and a low density adsorbant. The operational flow rate is chosen so that the adsorbant is compacted at the top of the column, while the gravel remains virtually compact at the bottom. Large particles which include organics may then be removed by the gravel, while colloids, organics, or phenols, are efficiently removed by the upper compact bed.

EXAMPLE

The invention will be illustrated by one simple example, described with reference to the accompanying drawing, in which FIGS. 1 and 2 are diagrammatic illustrations of a vessel forming part of an ion exchange installation for desalination of brackish water in two different operational modes.

The vessel 1 has at its upper and lower ends distributors 2, 3 for the flowing liquid which bound a reaction chamber. The distributors 2, 3 are in this instance nozzle plates. The nozzle slit size is 0.2 mm. The vessel 1 contains a bed of weak base ion exchange resin 6, of a height such that the free space 7 is 30% of the space occupied by the bed 6. During the service or exhaustion run, the feed water which in this instance is the effluent from a cation filter unit, is passed downflow such that its path is traced successively by an inlet 4, the distributor 2, the free space 7, the ion exchange bed 6, the distributor 3, and a service outlet 5. In one operation, the brackish feed water contained 8 milli-equivalents/liter TDS (Total Dissolved Solids) and was passed downflow through 400 liters of weak base resin 6 at a linear flow rate (per unit area) of 30 m/hr, 35 m$^3$ of product water being obtained in a single service run.

The arrangement of the same vessel 1 during upflow regeneration with a 4% NaOH solution is shown in FIG. 2. During the introduction of the NaOH solution at a linear flow rate of 4 m/hr via a conduit 8 and distributor 3, plug flow was approximated, and the resin bed rose and compacted against the distributor 2 from the top down as bed 9. The flow path of the NaOH can be traced by the conduit 8, the distributor 3, the free space 10, the compact bed 9, the distributor 2, and a waste outlet 11. The regeneration was carried out using 37 grams of NaOH per liter of resin.

In this example regeneration was succeeded by a rinse carried out upflow by introducing decationized water at 12. Alternative conventional rinse techniques for example involving the introduction of air are additionally acceptable.

After the completion of the upward rinse, the bed was allowed to fall to the bottom, whereupon stratification in terms of particle size was observed. A conventional downward rinse was then followed by the service run.

What we claim is:

1. A regenerative base ion exchange process involving the step of passing a liquid upwardly through a bed of particulate solid base ion exchange resin in a chamber of a two-phase reactor to regenerate said resin, wherein the rate of liquid flow is such that the solid resin is compacted and held by the liquid as a compact bed against a barrier located above it and is prevented by the liquid from sinking.

2. The process according to claim 1 wherein the flow of liquid approximates plug flow through the chamber containing the solid resin.

3. The process according to claim 2 wherein the liquid passes through distributors at upper and lower ends of the chamber, the distributors being adapted to retain the solid resin in the chamber and to cause the liquid flow to approximate plug flow.

4. The process according to claim 1 wherein the space occupied by the bed of solid resin when compact in the chamber is at least 50% of the chamber space.

5. The process according to claim 4 wherein said space occupied by the bed of solid resin when compact is not less than 60% and no more than 70% of the space in the chamber.

6. The process according to claim 1 wherein said solid granular resin consists of two or more components which are admixed or in layers.

7. The process according to claim 1 wherein the said chamber contains, in addition to the solid resin which forms said compact bed held by the liquid against a barrier above it, a particulate solid ion exchange resin which remains at a lower end of the chamber.

8. The process according to claim 1 wherein the state of upward flow in which the bed is held against the barrier above it is preceded by a state of liquid flow in which the bed remains at a lower end of the chamber, after which the bed is gradually expanded by an upward flow, and is finally compacted against the said barrier.

9. The process according to claim 1 wherein the liquid is NaOH solution being used to regenerate the ion exchange resin.

10. The process according to claim 9 wherein the bed of solid resin when compacted by the flow of liquid has a layer weak base ion exchange resin on top of a layer of strong base ion exchange resin.

11. The process according to claim 1 wherein the particulate solid resin filters and adsorbs at the same time.

* * * * *